United States Patent [19]

Compaan

[11] 4,099,358
[45] Jul. 11, 1978

[54] INTERLOCKING PANEL SECTIONS

[75] Inventor: Pieter Compaan, Coaldale, Canada

[73] Assignee: Intercontinental Truck Body - Montana, Inc., Conrad, Mont.

[21] Appl. No.: 782,067

[22] Filed: Mar. 28, 1977

Related U.S. Application Data

[63] Continuation-in-part of Ser. No. 640,096, Dec. 12, 1975, abandoned.

[30] Foreign Application Priority Data

Aug. 18, 1975 [CA] Canada ................................. 233624

[51] Int. Cl.² ........................... E04C 1/30; E04C 2/40
[52] U.S. Cl. .................................................... 52/588
[58] Field of Search .................................. 52/588, 522

[56] References Cited

U.S. PATENT DOCUMENTS

| 3,085,367 | 4/1963 | De Ridder et al. | 52/588 X |
| 3,111,203 | 11/1963 | De Ridder | 52/588 |
| 3,420,028 | 1/1969 | Barker | 52/588 |

Primary Examiner—Alfred C. Perham
Attorney, Agent, or Firm—Shlesinger, Arkwright, Garvey & Dinsmore

[57] ABSTRACT

This disclosure is directed to an interlocking construction panel, which when interlocked with an identical panel, will present a smooth flat surface on one side, with a plurality of longitudinal integral channels projecting from the opposite side. The panel comprises: a planar wall of elongate rectangular configuration; one longitudinal edge of this planar wall having an integral open channel projecting outwardly and downwardly therefrom with a bottom in parallel alignment therewith; the bottom of the channel has a longitudinal, central thickened portion; the open channel has an inwardly projecting longitudinal lip adjacent the open top thereof on the side thereof remote from the panel; the other side of the channel has a pair of inwardly projecting members, one in alignment with the planar wall and one therebeneath and, the other longitudinal edge of the planar wall has downwardly projecting interlock integral longitudinal parallel members, one adapted to be restrained within the pair of inwardly projecting members on one side of the open channel, the other being adapted for snap-lock engagement with the inwardly projecting longitudinal lip on the other side of the open channel. The novel construction permits a plurality of panels to be readily enjoined such that when assembled there is no necessity for a separate structural frame since the two inwardly projecting members on the side of the channel clamp one of the interlock members therebetween to resist shifting of adjacent panels.

4 Claims, 5 Drawing Figures

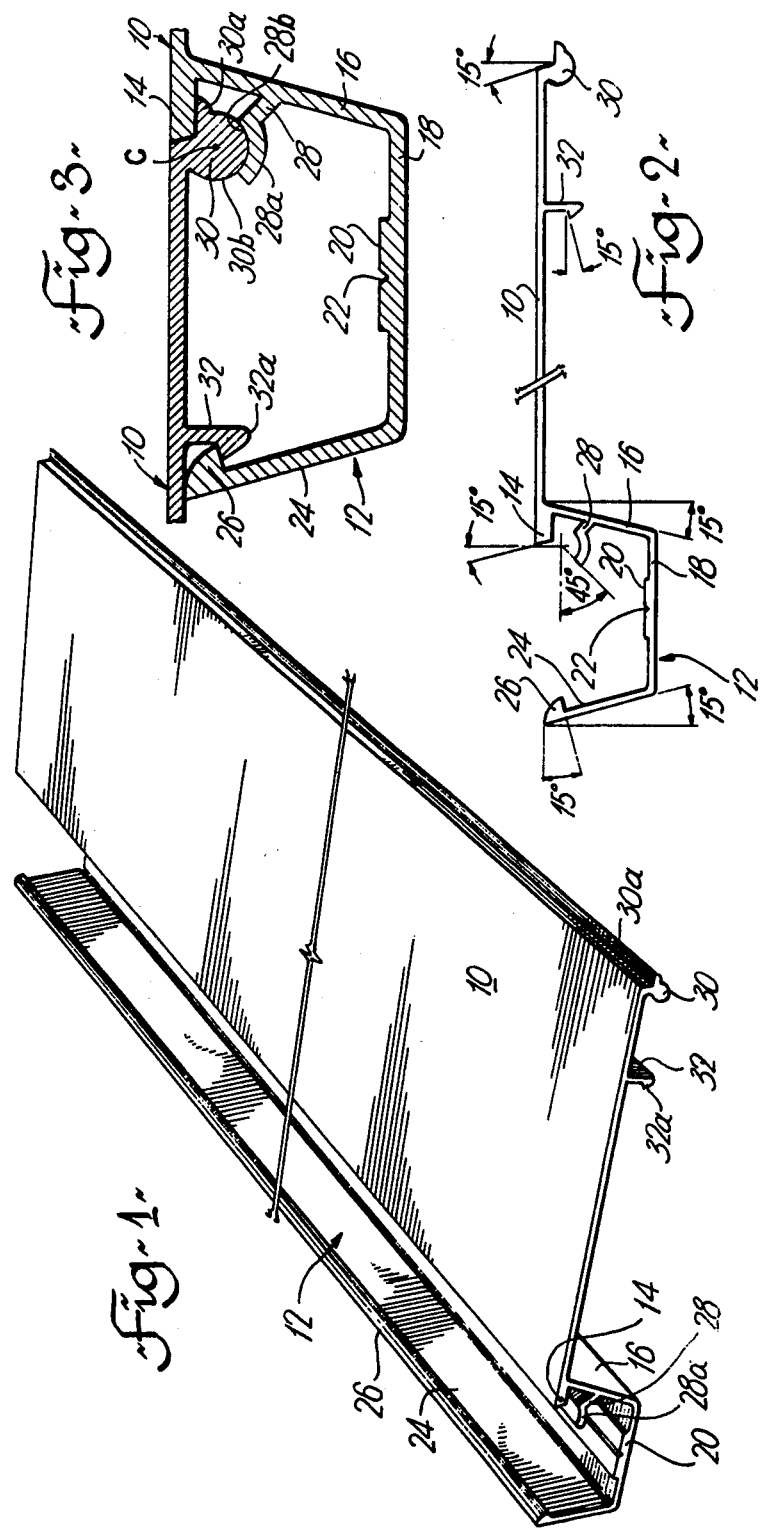

INTERLOCKING PANEL SECTIONS

CROSS REFERENCE TO RELATED APPLICATION

This application is a continuation-in-part of copending application Ser. No. 640,096 filed Dec. 12, 1975 now abandoned.

This invention is directed to an interlocking construction panel, which when interlocked with an identical panel, will present a smooth flat surface on one side, with a plurality of longitudinal integral channels projecting from the opposite side.

A principal object is to provide a novel interlocking, preferably metallic, construction panel which may be readily enjoined in interlocking relationship with identical such panels, without the need for separate structural frame supports, and at the same time achieve maximum strength, economy of manufacture, and ease of interlocking.

A further object is to provide an interlocking construction panel adapted for interlocked engagement with other identical panels, each panel comprising: a planar wall of elongate rectangular configuration; one longitudinal edge of the planar wall having an integral open channel projecting outwardly and downwardly therefrom with a bottom in parallel alignment therewith, the side walls of said channel projecting downwardly and inwardly at an angle of approximately 15°–18° from the planar wall; the bottom of the channel having a longitudinal, central thickened portion; the open channel having an inwardly projecting longitudinal lip adjacent the open top thereof on the side thereof remote from said panel; the other side of the channel having a pair of inwardly projecting members, one in alignment with the planar wall and one therebeneath; the other longitudinal edge of the planar wall having a downwardly projecting interlock integral longitudinal parallel members, one adapted to be restrained within the pair of inwardly projecting members on one side of the open channel, the other being adapted for snap-lock engagement with the inwardly projecting longitudinal lip on the other side of the open channel.

One important disadvantage of similar prior art panels has been that such panels could easily shift longitudinally with respect to an adjacent longitudinal panel. Thus prior art teachings required a separate peripheral frame which, in addition to providing supporting strength to a panel assembly also prevented shifting of adjacent panels.

These and other objects of the invention will become apparent with reference to the accompanying drawings in which:

FIG. 1 is a perspective view of a panel;

FIG. 2 is an end elevation of the panel according to FIG. 1;

FIG. 3 is a sectional view of a channel portion of a panel in interlocking engagement with interlocking elements of a companion panel;

Detailed reference will now be made to the drawings wherein like reference numerals will identify like parts.

Figure 5:
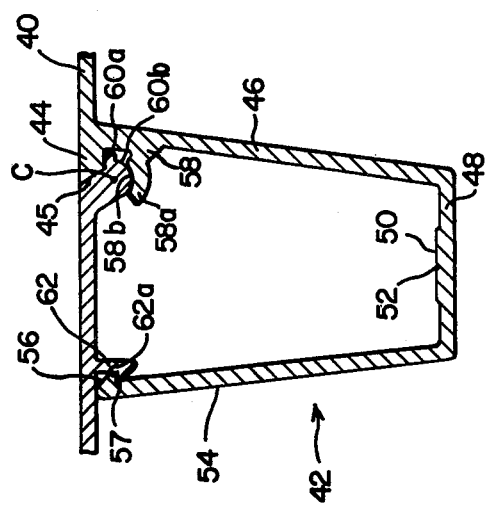
FIG. 5 is a fragmentary sectional view of a portion of the panel of FIG. 4.

The panel 10 includes a longitudinal channel indicated generally at 12, in FIG. 1. Panel 10 includes a lip portion 14 which projects inwardly along channel 12, lip portion 14 being slightly thicker than the thickness of the balance of panel 10. Longitudinal lip 14 terminates in an outer edge which slopes downwardly and inwardly at an angle of about 15° or any other suitable angle (See FIG. 2). Interior wall 16 of channel 12 slopes downwardly and outwardly, also at an angle of about 15°–18°. Bottom 18 of channel 12 is provided on its upper surface with a longitudinal thickened portion 20, having a downwardly projecting notch 22 longitudinally therein, as is seen most clearly in FIG. 3. Wall 24 of channel 12 projects upwardly and outwardly from bottom 18, at an angle of about 15°–18°, and terminates in an inwardly projecting enlarged portion 26 having a flat bottom surface which projects slightly upwardly, and a convex arcuate upper surface, to facilitate interlocking with an adjacent panel, as will become clear hereinafter.

A longitudinal inwardly projecting finger-like member 28 is integral with wall 16, member 28 terminating in a concavely curved portion 28a having an arcuate seat surface 28b.

The longitudinal edge of panel 10 remote from channel 12 terminates in a downwardly extending, generally cylindrical bead portion 30, having a forwarding projecting lip portion 30a and a cylindrical joint surface portion 30b. The portion of bead 30 above lip 30a extends upwardly and inwardly at an angle of about 15°, or any suitable angle to cooperate with the bevel angle on the edge of lip 14 as is seen most clearly in FIG. 2. Inwardly from bead 30, a longitudinally extending downwardly projecting finger 32 terminates in a thickened portion 32a which is generally triangular in cross-section, the bottom of said triangle being slightly rounded, and terminating in a flat surface at the top thereof, projecting inwardly toward finger 32 proper. The upper surface of thickened portion 32a is flat and is in alignment with the bottom surface of enlarged portion 26 of wall 24, when in interlocking engagement.

An important structural aspect is that the arcuate surfaces 28b and 30b have a radius of curvature which is equal to the radius of the cylindrical bead 30, and the center of rotation of the panels to be joined, as well as parts 28a and 30 will be the center of the cylindrical bead 30 indicated as C. As a consequence of this arrangement, as adjacent panels are being engaged, the member 28 must flex slightly during interlocking. Thereafter, member 28 exerts a force through surfaces 28b and 30b to clamp the bead 30 between members 28b and 14. This clamping action prevents relative shifting of adjacent panels without the need for a peripheral frame structure.

To assemble a panel into interlocking engagement with another, identical panel, lip 30a of bead 30 is inserted under longitudinal lip 14, with thickened portion 32a of finger 32 being directly above the convex arcuate upper surface of enlarged portion 26 of wall 24. Manual pressure on the surface of panel 10 above finger 32 will cause the angled wall of portion 32 thereof to slide against the convex arcuate upper surface of portion 26 and flex member 28 until locking is achieved when the panels are interlocked as illustrated in FIG. 3.

Thickened portion 20 of bottom 18 strengthens the channel, and it has been found that without this reinforcing thickness continued flexing of an assembled structure of panels according to the invention, such as when used in the construction of a truck body, there is a tendency for the panels to loosen. Further, notch 22 of thickened portion 20 provides an improved spring-like effect as the panels are being interlocked, and thus facilitates assembly.

It has further been found that while the sizes of panels according to the invention can be enlarged, pro rata, if the slopes of the channel sections are maintained at angles of about 15°-18° it is possible to avoid a wall structure which is either too rigid, or too flexible respectively and yet is quite strong.

Referring to the convex arcuate upper surface of enlarged portion 26 of wall 24, it has also been discovered that if this curvature is too great, interlocking engagement with portion 32a of finger 32 becomes difficult, or if this curvature is made relatively flat, interlocking proves equally difficult.

Figure 4:
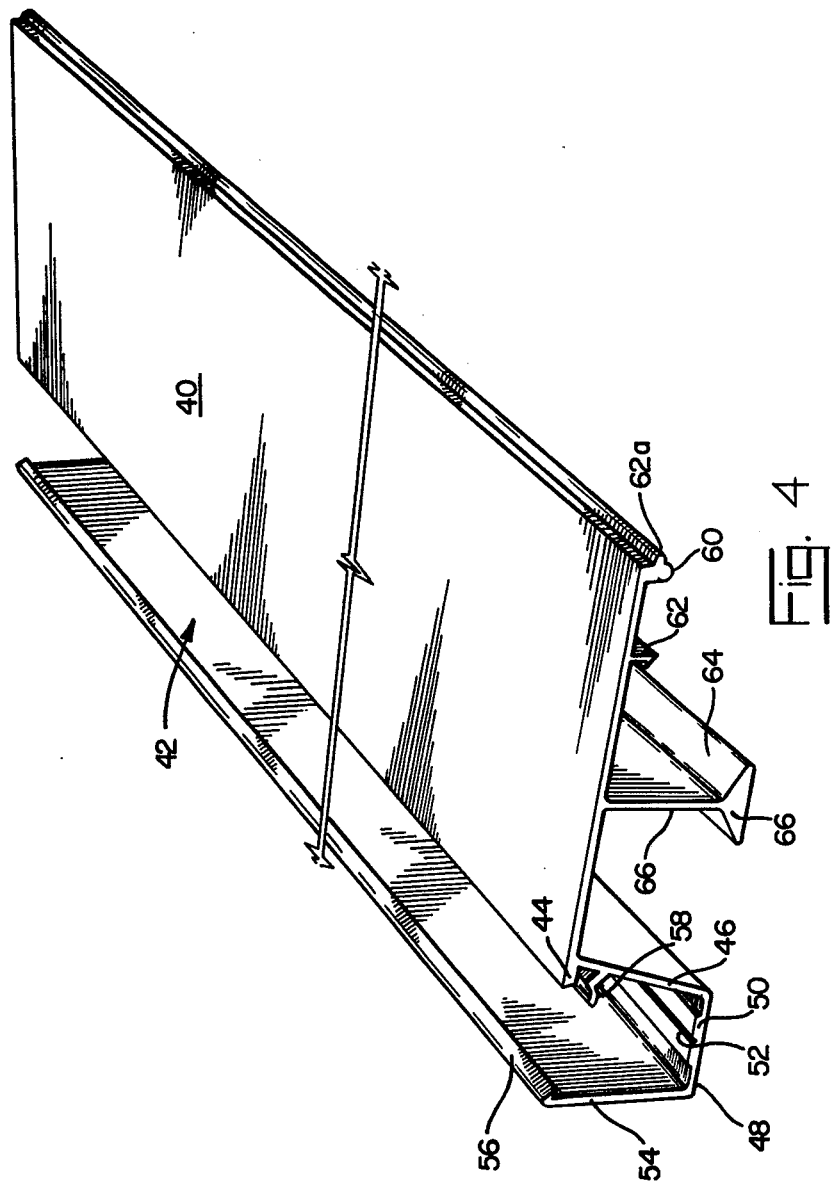
FIG. 4 is a perspective view of a panel according to an alternate embodiment.

The foregoing structure of FIGS. 1–3 is particularly suitable for wall and roof panels of truck bodies, trailer bodies, shipping containers, and the like. In some instances, such as floor panels, even greater strength is required, and the structure of FIGS. 4 and 5 is designed to provide such greater strength. Thus, a panel 40 includes a longitudinal channel generally designated 42. The panel 40 also includes a lip portion 44 projecting inwardly along channel 42, lip portion 44 being slightly thicker than the balance of the panel 40, but being substantially coplanar therewith along the upper surface. Longitudinal lip 44 terminates in an edge 45 which is beveled at a suitable angle typically within the range of about 15°-30°. Interior wall 46 of channel 42 slopes downwardly and outwardly. For floor panels, optimum strength is achieved when the wall 46 is at an angle of about 9°-11° from the vertical. Additionally, it will be seen that channel 42 is somewhat deeper than channel 12 of FIGS. 1–3. The bottom 48 of channel 42 also includes a thickened portion 50 which includes a downwardly projecting notch 52 running longitudinally therein. Wall 54 of channel 42 projects upwardly and outwardly from the bottom 48 again at an angle of about 9°-11°, and terminates in an inwardly projecting enlarged portion 56. Immediately adjacent the portion 56, a slight undercut 57 may be provided if desired. The projecting portion 56 has a beveled or convex upper surface to facilitate interlocking with an adjacent panel.

An inwardly projecting finger like member 58 runs longitudinally along wall 46, and terminates in a concavely curved portion 58a having an arcuate seat surface 58b.

The longitudinal edge of the panel 40 remote from the channel 42 terminates in a downwardly extending generally cylindrical bead portion 60 having a forwardly projecting lip 60a and a cylindrical joint surface portion 60b. The portion of bead 60 which is located above lip 60a extends upwardly and inwardly at approximately the same angle as beveled edge 45 so as to be substantially flush therewith. Inwardly from the bead 60, a longitudinally extending downwardly projecting latch finger 62 is provided at its terminus with a thickened portion which provides a flat surface 62a engageable with the member 56 for latching two panels together.

To further strengthen the panel 40 and improve its structural stability as a floor panel, a reinforcing rib 64 is provided. The member 64 includes a web portion 66 formed integrally with the panel 40 and a perpendicular base member 66 formed therewith.

As in the case of the embodiment of FIGS. 1–3 adjacent panels 40 are engaged with lip 60a under lip 44, and the panels are rotated about a center of rotation C located at the center of the cylindrical bead 60. As a result, during engagement, the member 58 must flex slightly to accomodate the engagement, and thereafter, when the latch finger 62 has engaged the projection 56, there is a clamping action between the projection 58 and the lip 44 on the cylindrical bead 60. This clamping action prevents relative longitudinal shifting of adjacent panels, and eliminates the need for a peripheral frame. Further, for a floor structure, it has been found that the walls 46 and 54 are preferably arranged at an angle of about 9°-11° vertical. As a result, a deeper channel 42 is formed and improved strength again results. Prior art panels typically had the center of rotation at a point along the top surface of panel 40, and thus the action was similar to a hinge, and absent any latching means, little if any force would be required to relatively rotate the panel member, and consequently, adjacent panels could shift relatively longitudinally.

The novel constructions disclosed herein permits a plurality of panels to be readily enjoined in interlocking relationship such that when assembled, there is no necessity for separate structural frames. The shape of the panel sections disclosed above has been designed after careful experimentation, in order to achieve maximum strength, greatest economy of manufacture, greatest east of interlocking, and greatest permanency of interlocked engagement.

While this invention has been described as having a preferred design, it will be understood that it is capable of further modification. This application, is, therefore, intended to cover any variations, uses, or adaptations of the invention following the general principles thereof and including such departures from the present disclosure has come within known or customary practice in the art to which this invention pertains, and as may be applied to the essential features herein before set forth and fall within the scope of this invention or the limits of the claims.

What is claimed is:

1. An interlocking construction panel adapted for interlocked engagement with other identical panels, said panel comprising:
   a planar wall of elongate rectangular configuration,
   one longitudinal edge of said wall having an integral open channel projecting downwardly therefrom with a bottom in parallel alignment therewith,
   said open channel having an inwardly projecting longitudinal latch member adjacent the open top thereof on one side thereof,
   the other side of said channel having first and second inwardly projecting members, said first inwardly projecting member being an extension of said planar wall and having upper and lower planar surfaces joined by a beveled edge at a fulcrum,
   said second inwardly projecting member having a resilient inwardly and upwardly projecting fingerlike configuration terminating in a trough-like, upwardly concave portion,
   the other longitudinal edge of said planar wall remote from said channel having first and second downwardly projecting integral longitudinally extending interlock members, said first interlock member comprising a generally cylindrical bead-like member adapted to be received in said trough-like portion and a projecting lip having a planar top surface adapted to bear against said fulcrum, said planar top surface being connected to said planar wall along a beveled edge contacting said planar top surface at an apex, said second interlock member having a configuration adapted for latching engagement with said latch member, said fulcrum and the distal end of said concave portion being spaced apart a distance equal to the distance between said apex and the point of contact between said bead-like member and said distal end when two of said panels are interlocked, and less than the distance between said apex and all other points on said bead-like member contacted by said distal end as two adjacent panels are being brought into interlocking engagement, whereby said second inwardly projecting member is resiliently deformed during interlocking of two adjacent panels so that said bead-like member is clamped between said first and second inwardly projecting members when two of said panels are in interlocked engagement.

2. A construction panel as in claim 1 and including a longitudinally extending integrally formed reinforcing rib on the underside of said planar wall.

3. A construction panel as in claim 2 and wherein side walls of said open channel are at an angle of about 9°–11°.

4. A construction panel as in claim 1 and wherein side walls of said open channel are at an angle of about 15°–18°.

* * * * *